US012786923B2

(12) United States Patent
Yamamoto et al.

(10) Patent No.: US 12,786,923 B2
(45) Date of Patent: Nov. 3, 2026

(54) USER EQUIPMENT, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventors: Tomoyuki Yamamoto, Kariya-city (JP); Hideaki Takahashi, Kariya-city (JP)

(73) Assignees: DENSO CORPORATION, Kariay-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

(21) Appl. No.: 18/485,382

(22) Filed: Oct. 12, 2023

(65) Prior Publication Data

US 2024/0089889 A1 Mar. 14, 2024

Related U.S. Application Data

(63) Continuation of application No. PCT/JP2022/017501, filed on Apr. 11, 2022.

(30) Foreign Application Priority Data

Apr. 19, 2021 (JP) ................................ 2021-070613

(51) Int. Cl.
*H04W 60/00* (2009.01)
*H04W 68/00* (2009.01)

(52) U.S. Cl.
CPC ......... *H04W 60/00* (2013.01); *H04W 68/005* (2013.01)

(58) Field of Classification Search
CPC ... H04W 60/00; H04W 68/005; H04W 76/27; H04W 88/06
See application file for complete search history.

(56) References Cited

U.S. PATENT DOCUMENTS

2020/0267539 A1* 8/2020 Tamura .................. H04W 8/26
2022/0116909 A1* 4/2022 Jung ................ H04W 74/0833
(Continued)

OTHER PUBLICATIONS

3GPP TSG-RAN WG2 Meeting #112e, Online, Nov. 2-13, 2020, R2-2009325, vivo, E-mail discussion: [Post111-e][917][Multi-SIM] Multi-Sim (vivo), pp. 1-74.
(Continued)

*Primary Examiner* — Margaret G Webb
(74) *Attorney, Agent, or Firm* — Harness, Dickey & Pierce, P.L.C.

(57) ABSTRACT

A user equipment comprises: a radio resource control (RRC) processor configured to perform processing in an RRC layer; and a non-access stratum (NAS) processor configured to perform processing in a NAS layer which is a layer higher than the RRC layer. In a case where the user equipment is in an RRC inactive state with respect to the second network during the communication with the first network, the RRC processor is configured to execute processing of receiving paging addressed to the user equipment from the second network, and notifying the NAS processor that the paging has been received in a case where a transmission-possible notification indicating that information indicating that the communication with the first network is prioritized over the communication with the second network is transmittable is provided from the NAS processor.

8 Claims, 7 Drawing Sheets

(56) References Cited

U.S. PATENT DOCUMENTS

| | | | | |
|---|---|---|---|---|
| 2022/0217675 A1* | 7/2022 | Chen | ..................... | H04W 68/02 |
| 2025/0287195 A1* | 9/2025 | Jung | ..................... | H04W 8/183 |
| 2025/0294491 A1* | 9/2025 | Kiss | ..................... | H04W 76/15 |

OTHER PUBLICATIONS

3GPP TSG-WG SA2 Meeting #143E e-meeting, Elbonia, Feb. 24-Mar. 9, 2021, S2-2100773, Sony, Nokia, Vivo, Xiaomi, Samsung, China Telecom, Charter, MediaTek, Oppo, Apple, Introduction of Reject Paging response to paging using RR, pp. 1-28.

TR 23.761 (Ver.1.3.0) Study on system enablers for devices having multiple Universal Subscriber Identity Modules (USIM), pp. 1-110, Mar. 2021.

TS 24.501 (Ver.17.2.1) Non-Access-Stratum (NAS) protocol for 5G System (5GS), pp. 1-757, Apr. 2021.

TS 38.331 (Ver. 16.4.1) NR; Radio Resource Control (RRC); Protocol specification, pp. 1-949, Mar. 2021.

R2-2101951 Report on LTE legacy, Mobility, DCCA, Multi-SIM and RAN slicing Vice Chairman (Nokia), pp. 1-79; Jan. 25-Feb. 5, 2021.

* cited by examiner

FIG. 6

Reception of the *Paging message* by the UE

Upon receiving the *Paging* message, the UE shall:

...

1> if in RRC_INACTIVE, for each of the *PagingRecord*, if any, included in the *Paging* message:

2> if the *ue-Identity* included in the *PagingRecord* matches the UE's stored *fullI-RNTI*:

...

3> if the upper layer indicated that the UE is capable of sending the busy indication, as defined in TS 24.501:

4> indicate to the upper layer that the paging message is received while in RRC_INACTIVE;

...

USER EQUIPMENT, AND COMMUNICATION CONTROL METHOD

CROSS-REFERENCE TO RELATED APPLICATIONS

The present application is a continuation application of international Patent Application No. PCT/JP2022/017501, filed on Apr. 11, 2022, which designated the U.S., and claims the benefit of priority of Japanese Patent Application No. 2021-070613, filed on Apr. 19, 2021, the entire contents of which are incorporated herein by reference.

TECHNICAL FIELD

The present disclosure relates to a user equipment and a communication control method used in a mobile communication system.

BACKGROUND ART

In Release 17 of 3GPP (registered trademark. The same applies hereinafter) (3rd Generation Partnership Project), which is a mobile communication system standardization project, a work item has been launched for designing a function for a user equipment equipped with a plurality of subscriber identification modules to perform data communication while existing in networks of a plurality of communication operators. Currently, a mechanism in which a user equipment existing in a plurality of networks receives paging is not specified in a standard specification, and is dependent on implementation of the user equipment. Therefore, a method of receiving paging from a plurality of networks in cooperation with each network has been studied in the field of 3GPP standardization.

Here, in a case where a user equipment that is in an RRC connected state with respect to one network (hereinafter, a "first network") and in an RRC idle state with respect to another network (hereinafter, a "second network") receives paging from the second network in a communication suspension period (referred to as a "gap") with the first network, when communication with the first network is prioritized over communication with the second network, it has been studied that a NAS processor of the user equipment transmits information (so-called busy indicator) indicating that communication with the first network is prioritized over communication with the second network to the second network (refer to, for example, Non Patent Literature 1). As a result, in response to the reception of the busy indicator, the second network can save paging resources by stopping subsequent paging addressed to the user equipment.

Note that, according to the current 3GPP standard, when the RRC processor of the user equipment in the RRC idle state receives paging addressed to the RRC processor itself from the network, the RRC processor notifies the NAS processor of the reception. On the other hand, when an RRC processor of the user equipment in an RRC inactive state receives paging addressed to the RRC processor itself from a network, the RRC processor initiates an RRC resume procedure and transitions to an RRC connected state without notifying the NAS processor of the reception (refer to, for example, Non Patent Literature 2).

CITATION LIST

Non Patent Literature

Non Patent Literature 1: 3GPP Technical Report: TR23.761(V1.3.0), "Study on system enablers for devices having multiple Universal Subscriber Identity Modules (USIM)" Non Patent Literature 2: 3GPP technical specification: TR38.331(V16.4.1), "NR; Radio Resource Control (RRC); Protocol specification"

SUMMARY OF INVENTION

A user equipment according to a first aspect that performs communication with a first network by using a first subscriber identity module and performs communication with a second network by using a second subscriber identity module, the user equipment comprising: a radio resource control (RRC) processor configured to perform processing in an RRC layer; and a non-access stratum (NAS) processor configured to perform processing in a NAS layer which is a layer higher than the RRC layer. In a case where the user equipment is in an RRC inactive state with respect to the second network during the communication with the first network, the RRC processor is configured to execute processing of receiving paging addressed to the user equipment from the second network, and notifying the NAS processor that the paging has been received in a case where a transmission-possible notification indicating that information indicating that the communication with the first network is prioritized over the communication with the second network is transmittable is provided from the NAS processor.

A communication control method according to a second aspect executed by a user equipment that performs communication with a first network by using a first subscriber identity module and performs communication with a second network by using a second subscriber identity module, the communication control method comprising the steps of: performing, by a radio resource control (RRC) processor of the user equipment, processing in an RRC layer; and performing, by a NAS processor of the user equipment, processing in a non-access stratum (NAS) layer which is a layer higher than the RRC layer. In a case where the user equipment is in an RRC inactive state with respect to the second network during the communication with the first network, the step of performing the processing in the RRC layer includes the steps of receiving paging addressed to the user equipment from the second network, and notifying the NAS processor that the paging has been received in a case where a transmission-possible notification indicating that information indicating that the communication with the first network is prioritized over the communication with the second network is transmittable is provided from the NAS processor.

BRIEF DESCRIPTION OF DRAWINGS

Objects, features, advantages, and the like of the present disclosure will become more apparent from the following detailed description with reference to the accompanying drawings.

FIG. 6 is a diagram illustrating an example of an operation of the UE according to the first operation example of the embodiment.

DESCRIPTION OF EMBODIMENTS

Figure 1:
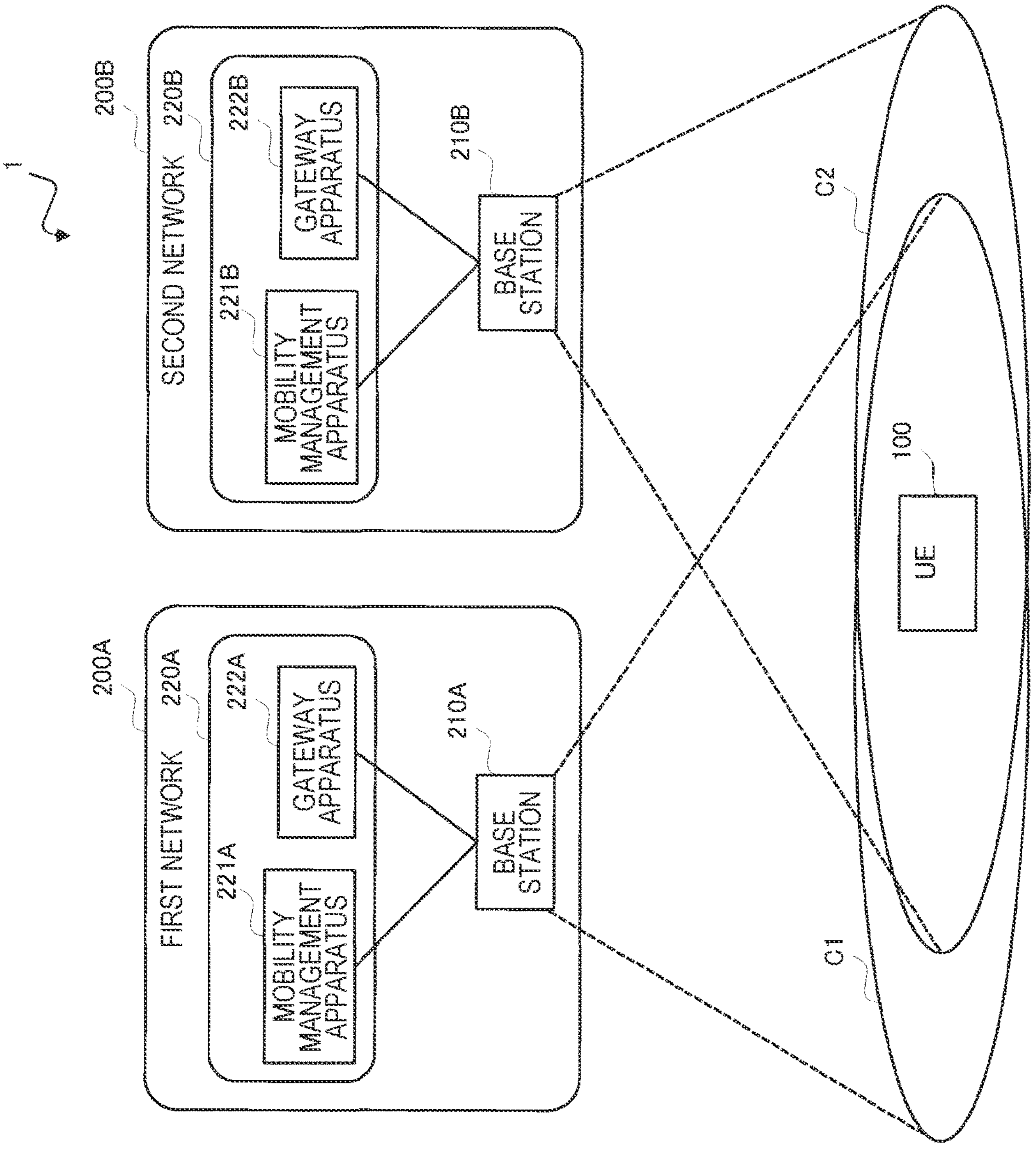
FIG. 1 is a diagram illustrating a configuration example of a mobile communication system according to an embodiment.

A mobile communication system according to an embodiment will be described with reference to the drawings. In the description of the drawings, the same or similar parts are denoted by the same or similar reference numerals.

In a case where the operation of transmitting the busy indicator as described above is also applied to the user equipment in an RRC inactive state, since the transmission of the busy indicator is performed by the NAS processor of the user equipment, it is considered that a notification indicating that paging addressed to the user equipment has been received from the second network is required to be provided from the RRC processor to the NAS processor. However, the NAS processor is not necessarily capable of transmitting the busy indicator. Therefore, even in a case where the NAS processor cannot transmit the busy indicator, if the notification is provided from the RRC processor to the NAS processor, unnecessary processing is performed inside the user equipment, and thus an unexpected error may occur.

Therefore, an object of the present disclosure is to provide a user equipment and a communication control method capable of suppressing unnecessary processing from being performed at the time of paging reception from the second network in a case where the user equipment is communicating with the first network and is in an RRC inactive state with respect to the second network.

Embodiment

An embodiment will be described with reference to FIGS. 1 to 7.

(System Configuration)

A configuration of a mobile communication system 1 according to the embodiment will be described with reference to FIG. 1. Hereinafter, an example will be mainly described in which the mobile communication system 1 is a fifth generation system (5G/NR: New Radio) under the 3GPP standard. A fourth generation system (4G/LTE: Long Term Evolution) system and/or a sixth generation system may be at least partially applied to the mobile communication system 1.

As illustrated in FIG. 1, the mobile communication system 1 according to the embodiment includes a user equipment (UE (User Equipment)) 100, a first network 200A, and a second network 200B.

The UE 100 may be a mobile radio communication apparatus. The UE 100 may be an apparatus used by a user. For example, the UE 100 is a mobile phone terminal (including a smartphone), a tablet terminal, a laptop PC, a communication module (including a communication card or a chipset), a sensor or equipment provided in the sensor, a vehicle or equipment provided in the vehicle (for example, a vehicle UE), or an aerial vehicle or equipment provided in the aerial vehicle (for example, an aerial UE).

UE 100 is a multi-SIM device supporting a plurality of subscriber identity modules (SIM (Subscriber Identity Module)). The UE 100 communicates with a plurality of networks by using a plurality of SIMS. Hereinafter, an example in which the UE 100 supports two SIMS will be mainly described; however, the UE 100 may support three or more SIMS. "Supporting a plurality of SIMS" means that the UE 100 has a capability to handle a plurality of SIMs, and the UE 100 may not be necessarily equipped with the plurality of SIMs. Such a UE 100 may be referred to as a "UE supporting a plurality of SIMS". Note that the SIM is not limited to a card type SIM (so-called a SIM card), and may be an embedded SIM (so-called an eSIM) that is integrated in the UE 100 in advance. The SIM may be referred to as a USIM (Universal Subscriber Identity Module).

The first network 200A is a network associated with one SIM of the UE 100. The second network 200B is a network associated with the other SIM of the UE 100. It is assumed that the UE 100 has performed location registration in the first network 200A using one SIM and performed location registration in the second network 200B using the other SIM. That is, the UE 100 exists in each of the first network 200A and the second network 200B. The first network 200A and the second network 200B may be networks of different communication operators. However, the first network 200A and the second network 200B may be networks of the same communication operators. Different PLMN (Public Land Mobile Network) IDs may be allocated to the first network 200A and the second network 200B.

The first network 200A includes a base station 210A constituting a radio access network and a core network 220A. The core network 220A includes a mobility management apparatus 221A and a gateway apparatus 222A. Similarly, the second network 200B includes a base station 210B constituting a radio access network and a core network 220B. The core network 220B includes a mobility management apparatus 221B and a gateway apparatus 222B. Hereinafter, the base stations 210A and 200B will be simply referred to as a base station 210 when they are not distinguished, the mobility management apparatuses 221A and 221B will be simply referred to as a mobility management apparatus 221 when they are not distinguished, and the gateway apparatuses 222A and 222B will be simply referred to as a gateway apparatus 222 when they are not distinguished.

The base station 210 is a radio communication apparatus that performs radio communication with the UE 100. The base station 210 manages one or a plurality of cells. The base station 210 performs radio communication with the UE 100 that has established a connection with its cell in a radio resource control (RRC) layer. The base station 210 has a radio resource management (RRM) function, a routing function of user data (hereinafter, simply referred to as "data"), a measurement control function for mobility control and scheduling, and the like. The "cell" is used as a term indicating a minimum unit of a radio communication area. The "cell" is also used as a term indicating a function or a resource that performs radio communication with the UE 100. One cell belongs to one carrier frequency. FIG. 1 illustrates an example in which the base station 210A manages a cell C1 and the base station 210B manages a cell C2. The UE 100 is located in an overlapping region of the cell C1 and the cell C2.

The base station 210 may be a gNB, which is a 5G/NR base station, or an eNB, which is a 4G/LTE base station. Hereinafter, an example in which the base station 210 is a gNB will be mainly described. The function of the base station 210 may be divided into a CU (Central Unit) and a DU (Distributed Unit). The base station 210 may be a relay node such as an IAB (Integrated Access and Backhaul) node.

The mobility management apparatus 221 is an apparatus supporting a control plane, and is an apparatus that performs various mobility management for the UE 100. The mobility management apparatus 221 communicates with the UE 100 using NAS (Non-Access Stratum) signaling and manages information on a tracking area in which the UE 100 exists. The mobility management apparatus 221 performs paging through the base station 210 to notify the UE 100 of an incoming call. The mobility management apparatus 221 may be an AMF (Access and Mobility Management Function) in 5G/NR or an MME (Mobility Management Entity) in 4G/LTE.

The gateway apparatus 222 is an apparatus supporting a user plane and performs transfer control of data of the UE 100. The gateway apparatus 222 may be a UPF (User Plane Function) in 5G/NR or a S-GW (Serving Gateway) in 4G/LTE.

(Configuration Example of Protocol Stack)

Figure 2:
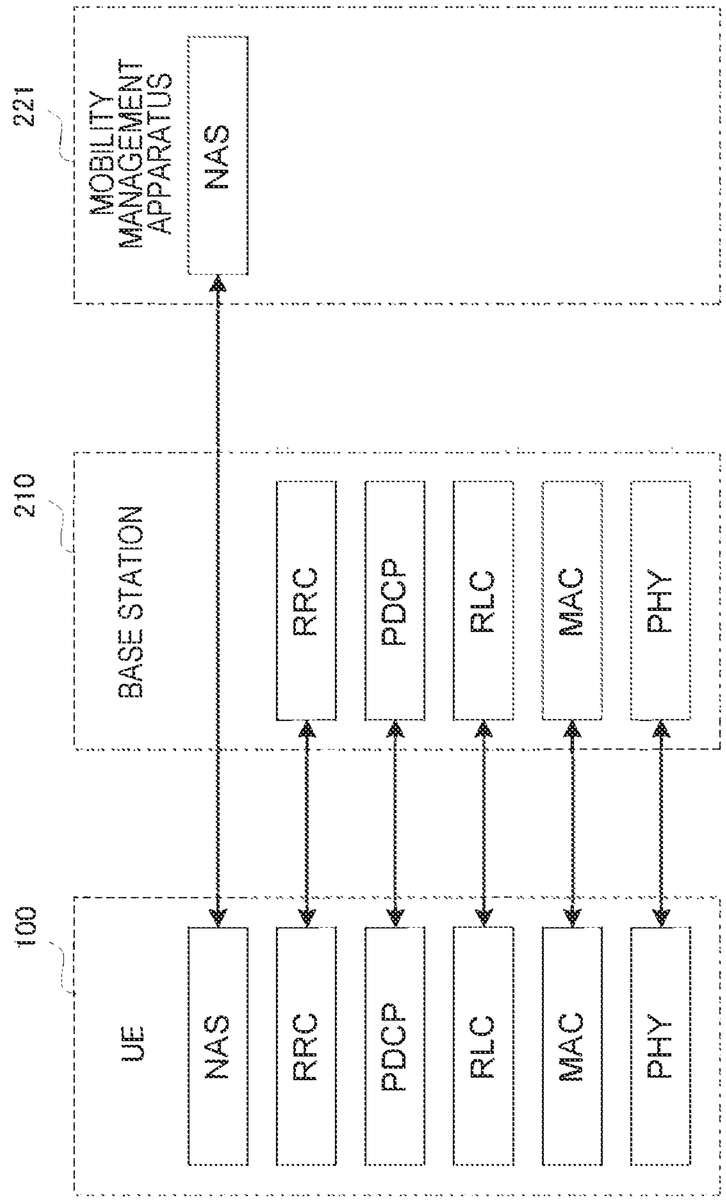
FIG. 2 is a diagram illustrating a configuration example of a protocol stack of the mobile communication system according to the embodiment.

A configuration example of a protocol stack of the mobile communication system 1 will be described with reference to FIG. 2. As illustrated in FIG. 2, a protocol of a radio section between the UE 100 and the base station 210 includes a physical (PHY) layer, a MAC (Medium Access Control) layer, a RLC (Radio Link Control) layer, a PDCP (Packet Data Convergence Protocol) layer, and an RRC (Radio Resource Control) layer.

The PHY layer performs encoding/decoding, modulation/demodulation, antenna mapping/demapping, and resource mapping/demapping. Data and control information are transmitted via a physical channel between the PHY layer of the UE 100 and the PHY layer of the base station 210.

The MAC layer performs data priority control, retransmission processing by hybrid ARQ (HARM), a random access procedure, and the like. Data and control information are transmitted via a transport channel between the MAC layer of the UE 100 and the MAC layer of the base station 210. The MAC layer of the base station 210 includes a scheduler. The scheduler determines uplink and downlink transport formats (transport block size, modulation and coding scheme (MCS)) and allocated resources to the UE 100.

The RLC layer transmits data to the RLC layer on the reception side using the functions of the MAC layer and the PHY layer. Data and control information are transmitted via a logical channel between the RLC layer of the UE 100 and the RLC layer of the base station 210.

The PDCP layer performs header compression/decompression and encryption/decryption.

A SDAP (Service Data Adaptation Protocol) layer may be provided as an upper layer of the PDCP layer. The SDAP (Service Data Adaptation Protocol) layer performs mapping between an IP flow, a unit in which a core network performs QoS (Quality of Service) control, and a radio bearer, a unit in which an AS (Access Stratum) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 210. In a case where there is an RRC connection between the RRC of the UE 100 and the RRC of the base station 210, the UE 100 is in an RRC connected state. In a case where there is no RRC connection between the RRC of the UE 100 and the RRC of the base station 210, the UE 100 is in an RRC idle state. In a case where the RRC connection between the RRC of the UE 100 and the RRC of the base station 210 is suspended, the UE 100 is in an RRC inactive state.

The NAS layer located above the RRC layer performs session management and mobility management of the UE 100. NAS signaling is transmitted between the NAS layer of the UE 100 and the NAS layer of the mobility management apparatus 221.

Note that the UE 100 has an application layer and the like in addition to the protocol of the radio interface.

Configuration Example of UE

Figure 3:
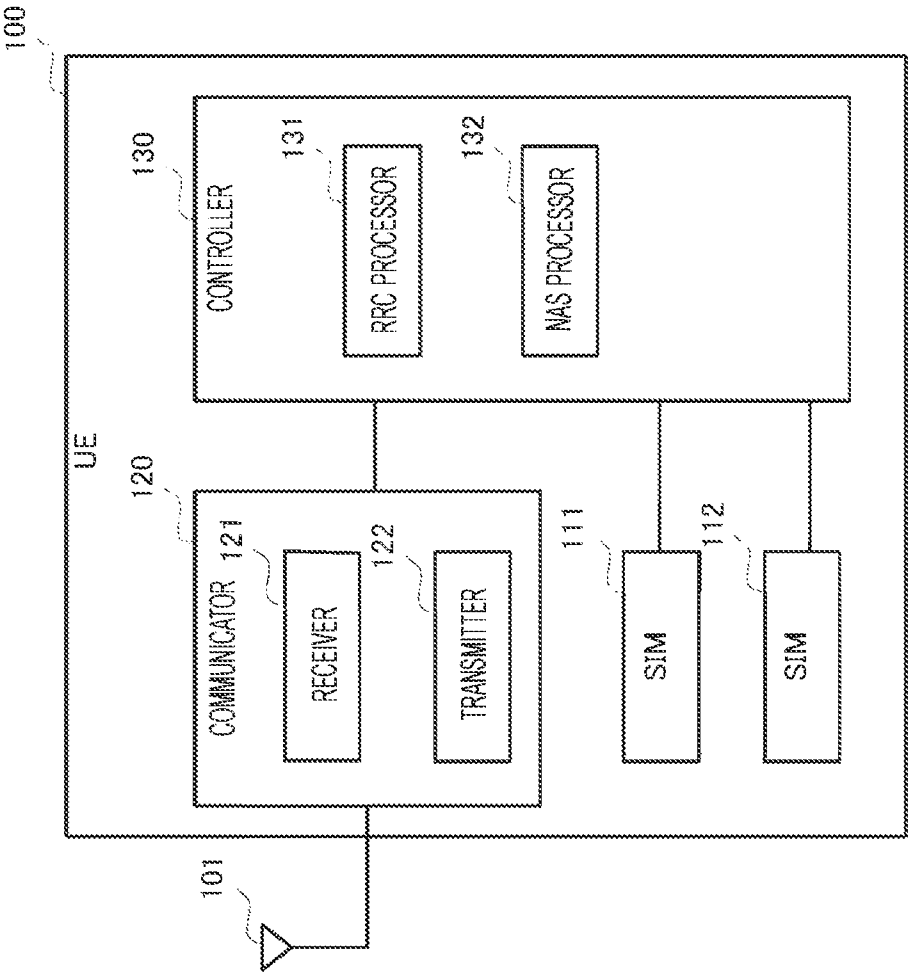
FIG. 3 is a diagram illustrating a configuration example of a user equipment (UE) according to the embodiment.

A configuration example of the UE 100 will be described with reference to FIG. 3. As illustrated in FIG. 3, the UE 100 includes an antenna 101, a SIM 111, a SIM 112, a communicator 120, and a controller 130. The antenna 101 may be provided outside the UE 100. The SIM 111 and the SIM 112 are SIM cards or eSIMs.

The SIM 111 stores subscriber information and configuration information necessary for the UE 100 to communicate with the first network 200A. The SIM 111 stores identification information of the UE 100 in the first network 200A, for example, a telephone number, an IMSI (International Mobile Subscriber Identity), and the like.

The SIM 112 stores subscriber information and configuration information necessary for the UE 100 to communicate with the second network 200B. The SIM 112 stores identification information of the UE 100 in the second network 200B, for example, a telephone number, an IMSI, and the like.

The communicator 120 performs radio communication with the first network 200A and radio communication with the second network 200B via the antenna 101 under the control of the controller 130. The communicator 120 may include only one receiver (RX (Receiver)) 121. In this case, the communicator 120 cannot simultaneously perform reception from a first network 200A and reception from a second network 200B. The communicator 120 may include only one transmitter (TX (Transmitter)) 122. However, the communicator 120 may include a plurality of transmitters 122. The receiver 121 converts a radio signal received by the antenna 101 into a received signal that is a baseband signal, performs signal processing on the received signal, and outputs the received signal to the controller 130. The transmitter 122 performs signal processing on a transmission signal that is a baseband signal output by the controller 130, converts the transmission signal into a radio signal, and transmits the radio signal from the antenna 101.

The controller 130 controls the communicator 120 and performs various types of control in the UE 100. The controller 130 controls communication with the first network 200A using the SIM 111 and controls communication with the second network 200B using the SIM 112. The controller 130 includes at least one processor and at least one memory. The memory stores a program executed by the processor and information used for processing by the processor. The memory may include at least one of a ROM (Read Only Memory), an EPROM (Erasable Programmable Read Only Memory), an EEPROM (Electrically Erasable Programmable Read Only Memory), a RAM (Random Access Memory), and a flash memory. The processor may include a digital signal processor (DSP) that performs digital processing on a digital signal and a central processing unit (CPU) that executes a program. Note that a part of the memory may be provided in the communicator 120. In addition, the DSP may be provided in the communicator 120.

The controller 130 includes an RRC processor 131 and an NAS processor 132. The RRC processor 131 performs a process in the processing of the RRC layer. The NAS processor 132 performs a process in the processing of the NAS layer which is a layer higher than the RRC layer. Note that the RRC processor 131 and the NAS processor 132 may be configured by one processor or may be configured by a plurality of processors.

The UE 100 configured as described above communicates with the first network 200A by using the SIM 111, and communicates with the second network 200B by using the SIM 112. The UE 100 includes the RRC processor 131 and the NAS processor 132. In a case where the UE 100 is an RRC inactive state with respect to the second network 200B while communicating with the first network 200A, the RRC processor 131 performs a process of receiving paging addressed to the UE 100 from the second network 200B, and a process of notifying the NAS processor 132 that the paging has been received when a transmission-possible notification indicating that information (specifically, a busy indicator that will be described later) indicating that communication with the first network 200A is prioritized over communication with the second network 200B can be transmitted is provided from the NAS processor 132.

As a result, when the transmission-possible notification is provided to the RRC processor 131, the NAS processor 132 can grasp that paging has been received. As a result, since the NAS processor 132 can transmit the busy indicator to the second network 200B, it is possible to save resources of the second network 200B due to unnecessary paging. On the other hand, in a case where the NAS processor 132 does not provide the transmission-possible notification to the RRC processor 131, it is not notified that paging has been unnecessarily received, and thus, it is possible to suppress unnecessary processing from being performed in the UE 100 at the time of paging reception from the second network 200B in a case where the UE 100 is communicating with the first network 200A and is in an RRC inactive state with respect to the second network 200B. As a result, the occurrence of an unexpected error can be suppressed. It is possible to suppress the occurrence of power consumption of the UE 100 due to unnecessary processing.

In a case where the UE 100 in an RRC inactive state has the transmission capability of the busy indicator, the NAS processor 132 may provide the transmission-possible notification to the RRC processor 131. As a result, when the UE 100 does not have the transmission capability of the busy indicator, the RRC processor 131 does not notify the NAS processor 132 that the paging has been received, when the busy indicator cannot be transmitted even if the paging has been received. Therefore, the occurrence of an unexpected error can be suppressed, and the occurrence of power consumption of the UE 100 due to unnecessary processing can be suppressed.

When the transmission of the busy indicator is accepted from the second network 200B, the NAS processor 132 may provide the RRC processor 131 with the transmission-possible notification. As a result, the NAS processor 132 can transmit the busy indicator in cooperation with the second network 200B.

The NAS processor 132 may transmit capability information indicating that the UE 100 in an RRC inactive state has the transmission capability of the busy indicator to the second network. After transmitting the capability information, the NAS processor 132 may receive information indicating that the transmission of the busy indicator is accepted from the second network 200B, from the second network 200B. The second network 200B can accept the transmission of the busy indicator in consideration of the capability information of the UE 100.

The RRC inactive state may be a state in the RRC layer. When the UE 100 is in an RRC inactive state with respect to the first network 200A, the NAS processor 132 may transmit the busy indicator by using a service request message for transitioning a mode in the NAS layer from an idle mode to a connected mode. As a result, for example, the busy indicator can be transmitted without adding a new information element to an existing message. Therefore, the influence on the existing mechanism can be made very small.

An operation of a functional unit (specifically, at least one of the antenna 101, the SIM 111, the SIM 112, the communicator 120, and the controller 130 (the RRC processor 131 and the NAS processor 132)) included in the UE 100 may be described as an operation of the UE 100.

Configuration Example of Base Station

Figure 4:
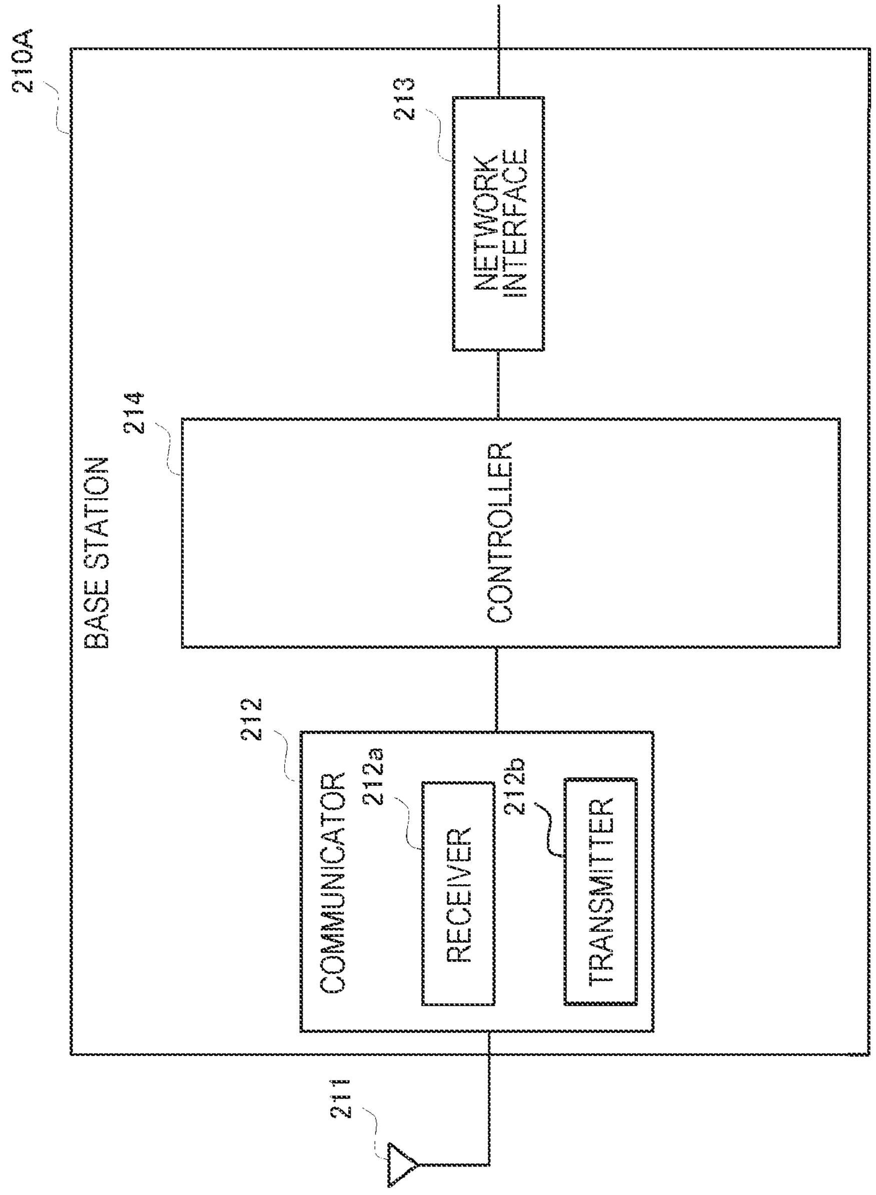
FIG. 4 is a diagram illustrating a configuration example of a base station of a first network according to the embodiment.

A configuration example of the base station 210A of the first network 200A will be described with reference to FIG. 4. Since the base station 210B of the second network 200B also has the same configuration as the base station 210A, the description thereof will be omitted. As illustrated in FIG. 4, the base station 210A includes an antenna 211, a communicator 212, a network interface 213, and a controller 214.

The communicator 212 performs communication with the UE 100 via the antenna 211 under the control of the controller 214. The communicator 212 includes a receiver 212*a* and a transmitter 212*b*. The receiver 212*a* converts a radio signal received by the antenna 211 into a received signal that is a baseband signal, performs signal processing on the received signal, and outputs the received signal to the controller 214. The transmitter 212*b* performs signal processing on a transmission signal that is a baseband signal output by the controller 214, converts the transmission signal into a radio signal, and transmits the radio signal from the antenna 211.

The network interface 213 is connected to the core network 220A. The network interface 213 performs network communication with the mobility management apparatus 221A and the gateway apparatus 222A under the control of the controller 214.

The controller 214 controls the communicator 212 and performs various types of control in the base station 210A. The controller 214 includes at least one processor and at least one memory. The memory stores a program executed by the processor and information used for processing by the processor. The memory may include at least one of a ROM, an EPROM, an EEPROM, a RAM, and a flash memory. The processor may include a digital signal processor (DSP) that performs digital processing on a digital signal and a central processing unit (CPU) that executes a program. Note that a part of the memory may be provided in the communicator 212. In addition, the DSP may be provided in the communicator 212.

In a base station 210A of the first network 200A configured as described above, a communicator 212 receives, from the UE 100, a share configuration request for requesting a configuration for sharing, in a time division manner, a suspension timing at which communication with the base station 210A is suspended between a first measurement operation on the first network 200A and a second measurement operation on the second network 200B. A controller 214 acquires the share configuration request. As a result, the controller 214 can grasp that the UE 100 requests the configuration for sharing the suspension timing in a time division manner between the first measurement operation and the second measurement operation. The controller 214 can determine an appropriate suspension timing in consideration of the fact that the UE 100 requests the configuration.

Note that an operation of a functional unit (specifically, at least one of the antenna 211, the communicator 212, the network interface 213, and the controller 214) included in the base station 210A may be described as an operation of the base station 210A.

(Operation of Mobile Communication System)

An operation of the mobile communication system 1 will be described.

(1) First Operation Example

A first operation example of the mobile communication system 1 will be described with reference to FIGS. 5 and 6. In the operation example illustrated in FIG. 5, the UE 100 exists in a cell C1 managed by the base station 210B of the first network 200A and exists in a cell C2 managed by the base station 210B of the second network 200B. Note that the description will be made assuming that a mobility management apparatus 221B of the second network 200B is an AMF.

Hereinafter, the RRC processor 131 and the NAS processor 132 communicate (specifically, transmission and reception/notification of messages and the like) with the second network 200B via the communicator 120, but for convenience of description, the description of communication via the communicator 120 will be omitted as appropriate. The AMF 221B communicates (transmission/reception/notification of messages and the like) with the UE 100 (specifically, the NAS processor 132) via the base station 210B, but for convenience of description, the description of the communication via the base station 210B will be omitted as appropriate.

Step S101:

The UE 100 and the second network 200B initiate a registration procedure. The UE 100 (NAS processor 132) transmits a registration request message to the AMF 221B. The AMF 221B receives the registration request message from the UE 100. The registration request message is a message for initially registering or updating registration of the UE 100 to the second network 200B.

The NAS processor 132 may cause capability information indicating that the UE 100 in an RRC inactive state has the transmission capability of the busy indicator to be included in the registration request message. As a result, the NAS processor 132 may transmit capability information indicating that the UE 100 has the transmission capability of the busy indicator to the second network 200B.

The busy indicator is information indicating that, in a case where the priority of communication with a network (hereinafter, the first network 200A) other than the second network 200B is higher than the priority of communication with the second network 200B, the communication with the first network 200A is prioritized over the communication with the second network 200B. The busy indicator may indicate that the UE 100 is busy.

Step S102:

The AMF 221B transmits a registration accept (Registration Accept) message to the UE 100. The NAS processor 132 of the UE 100 receives the registration accept message from the AMF 221B. The registration accept message is a message indicating that registration to the second network 200B or registration update is accepted.

The registration accept message may include transmission acceptance information indicating that transmission of the busy indicator is accepted from the second network 200B.

The AMF 221B may determine whether to accept the transmission of the busy indicator in consideration of the capability information of the UE 100. For example, in a case where the registration request message includes capability information indicating that the UE 100 in an RRC inactive state has the transmission capability of the busy indicator, the AMF 221B may determine to accept the transmission of the busy indicator. In a case where the registration request message does not include the capability information, the AMF 221B may determine not to accept the transmission of the busy indicator. In a case where it is determined to accept the transmission of the busy indicator, the AMF 221B may cause transmission acceptance information to be included in the registration accept message.

The NAS processor 132 may determine that the transmission of the busy indicator is accepted from the second network 200B in response to the reception of the transmission acceptance information.

Step S103:

The NAS processor 132 transmits a registration complete (Registration Complete) message to the AMF 221B. The AMF 221B receives the registration complete message from the UE 100. The registration complete message is, for example, a message indicating that the process of registration to the second network 200B or registration update is successfully completed in the UE 100.

Step S104:

The NAS processor 132 provides a transmission-possible notification to the RRC processor 131. The RRC processor 131 receives the transmission-possible notification from the NAS processor 132. The transmission-possible notification indicates that information (that is, the busy indicator) indicating that communication with the first network 200A is prioritized over communication with the second network 200B can be transmitted. As illustrated in FIG. 6, the transmission-possible notification may indicate that the UE 100 has the transmission capability of the busy indicator.

In a case where the transmission of the busy indicator is accepted from the second network 200B, the NAS processor 132 may provide the transmission-possible notification to the RRC processor 131.

Figure 5:
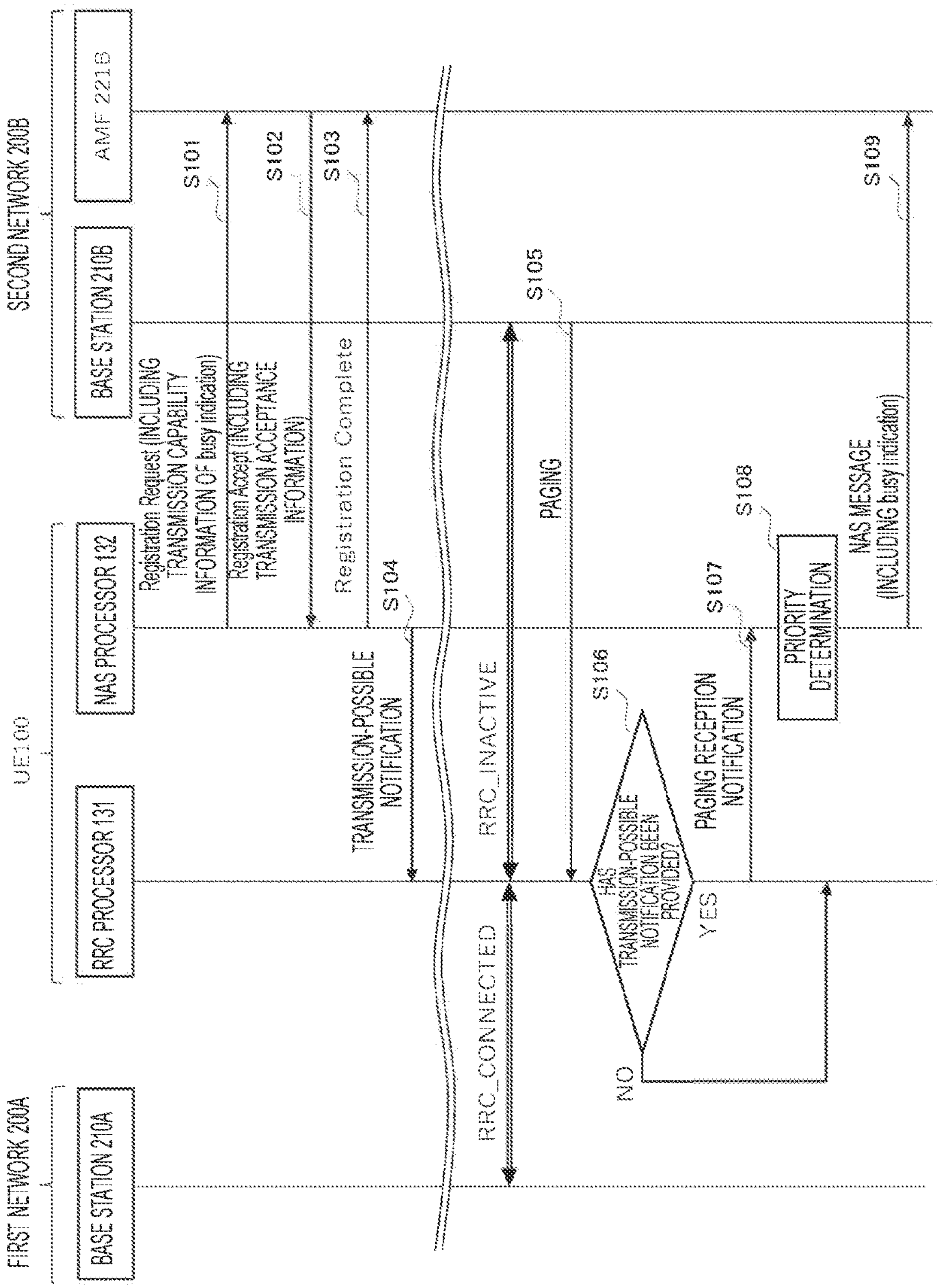
FIG. 5 is a diagram illustrating a first operation example of the embodiment.

As illustrated in FIG. 5, it is assumed that the UE 100 is then in an RRC connected state with respect to the first network 200A and in an RRC inactive state with respect to the second network 200B. The UE 100 is communicating with the first network 200A. For example, the UE 100 is provided with a service such as a voice call from the first network 200A. Therefore, the UE 100 is in an RRC inactive state with respect to the second network 200B during communication with the first network 200A.

Note that the RRC connected state and the RRC inactive state (and the RRC idle state) are states in the RRC layer. The mode in the NAS layer of the UE 100 is a connected mode with respect to the first network 200A and the connected mode with respect to the second network 200B. The mode in the NAS layer may be a 5G mobility management (5GMM) mode. In this mode, the connected mode may be a 5GMM-connected mode, and the idle mode may be a 5GMM-idle mode.

Step S105:

The base station 210 transmits a paging message addressed to the UE 100 to the UE 100. The RRC processor 131 of the UE 100 receives the paging message addressed to the UE 100 from the base station 210B.

The paging message is used for notification to one or more UEs 100. The paging message is an RRC layer message. The paging message includes, for example, an ID of the UE 100. More specifically, for example, the paging message includes a list of paging records, and one paging record in the list includes the ID of the UE 100. For example, the ID is 5G-S-TMSI (Temporary Mobile Subscriber Identity) or a full I-RNTI (Inactive Radio Network Temporary Identifier) of the UE 100.

The RRC processor 131 can execute the process in step S106 when the UE 100 is in an RRC inactive state with respect to the second network 200B during communication with the first network 200A.

In a case where the UE 100 is not communicating with the first network 200A, for example, in a case where the UE 100 is (a) in an RRC idle state or an RRC inactive state with respect to the first network 200A or is (b) in an RRC idle state or an RRC connected state with respect to the second network 200B, the RRC processor 131 may execute a specified process when the paging message is received without executing the process in step S106.

Step S106:

The RRC processor 131 determines whether or not the transmission-possible notification is provided from the NAS processor 132. In a case where the transmission-possible notification is provided from the NAS processor 132, the RRC processor 131 executes the process in step S107. On the other hand, in a case where the transmission-possible notification is not provided from the NAS processor 132, the RRC processor 131 does not execute the process in step S106. In this case, the RRC processor 131 may execute a specified process when the paging message is received.

Step S107:

The RRC processor 131 provides a paging reception notification to the NAS processor 132. The NAS processor 132 receives the paging reception notification. The paging reception notification is for notifying that the UE 100 has received the paging.

As illustrated in FIG. 6, the RRC processor 131 may indicate to the NAS processor 132 that the paging message is received when the UE 100 is in an RRC inactive state on the basis of the paging reception notification.

Step S108:

The NAS processor 132 determines a priority. Specifically, the NAS processor 132 determines which of communication with the first network 200 and communication with the second network 200B corresponding to the paging is prioritized (or which is preferred).

In a case where it is determined that communication with the first network 200A is prioritized over communication with the second network 200B (YES), the NAS processor 132 executes the process in step S107. On the other hand, in a case where it is determined that the communication with the second network 200B is prioritized over the communication with the first network 200A (NO), the NAS processor 132 starts to establish RRC connection with the second network 200B, for example, without performing the process in step S109. Therefore, the UE 100 initiates an RRC resume procedure and transitions to an RRC connected state without notifying the NAS processor 132 that the paging has been received.

Step S109:

The NAS processor 132 transmits a NAS message to the AMF 221B. The AMF 221B receives the registration request message from the UE 100. The NAS message includes a busy indicator.

The NAS processor 132 may transmit the busy indicator to the AMF 221B by using a service request message as the NAS message.

The service request message is used to change the 5GMM mode from a 5GMM-idle mode to a 5GMM-connected mode. The service request message may include a service type. The service type is an information element for identifying the purpose of the service request procedure. The service type may indicate that the UE 100 is busy.

The NAS processor 132 may transmit the busy indicator to the AMF 221B by using the service request message in a case of receiving the paging reception notification from the RRC processor 131 when the UE 100 is in an RRC inactive state even though the UE is in a 5GMM-connected mode on the 3GPP access.

In response to the reception of the busy indicator, the AMF 221B stops subsequent paging to the UE 100. More specifically, the AMF 221B stops paging escalation and paging repetition.

(2) Second Operation Example

Figure 7:
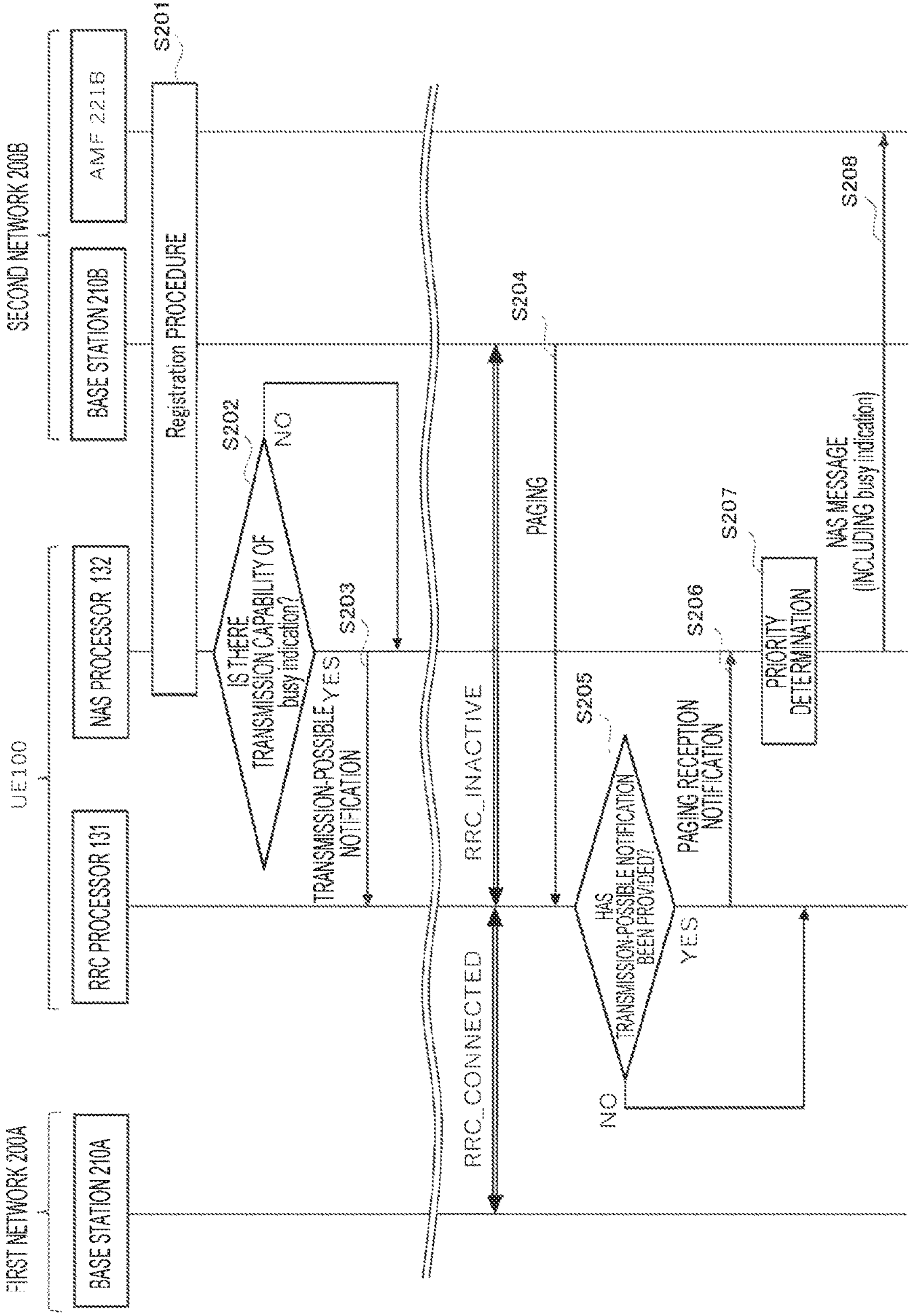
FIG. 7 is a diagram illustrating a second operation example of the embodiment.

With reference to FIG. 7, the second operation example will be described focusing on differences from the above-described operation example. In the second operation example, the UE 100 autonomously provides transmission acceptance information.

Step S201:

The UE 100 and the second network 200B perform a registration procedure. The UE 100 and the AMF 221B may perform the same processes as those in steps S101 to S103. However, the registration request message does not need to include the capability information indicating that the UE 100 has the transmission capability of the busy indicator. The registration accept message does not need to include the transmission acceptance information.

Step S202:

The NAS processor 132 of the UE 100 determines whether or not the UE 100 in the RC inactive state has the transmission capability of the busy indicator. The NAS processor 132 may determine whether or not the UE 100 has the transmission capability on the basis of the capability information of the UE 100, for example. In a case where the capability information indicating that the UE 100 has the transmission capability is stored, the NAS processor 132 determines that the UE 100 has the transmission capability. On the other hand, in a case where the NAS processor 132 does not store the capability information indicating that the UE 100 has the transmission capability, it is determined that the UE 100 does not have the transmission capability.

In a case where the UE 100 has the transmission capability (YES), the NAS processor 132 performs the process in step S203. Therefore, in a case where the UE 100 in an RRC inactive state has the transmission capability of the busy indicator, the NAS processor 132 performs the process in step S203. On the other hand, in a case where the UE 100 does not have the transmission capability (NO), the NAS processor 132 omits the process in step S203.

Steps S203 to S208:

These are similar to steps S104 to S109.

Other Embodiments

In the above-described embodiment, the NAS processor 132 may transmit the capability information to the second network 200B by a message other than the registration request message.

In the above-described embodiment, the NAS processor 132 may transmit the busy indicator to the second network 200B by using a NAS message other than the service request message.

The steps in the operation of the above-described embodiment may not necessarily be performed in chronological order according to the order described in the flow diagram or sequence diagram. For example, the steps in the operation may be performed in an order different from the order described as the flow diagram or sequence diagram, or may be performed in parallel. In addition, some of the steps in the operation may be removed and additional steps may be added to the processing. Furthermore, each operation flow described above is not necessarily implemented separately and independently and a combination of two or more operation flows can be implemented. For example, some steps of one operation flow may be added to another operation flow, or some steps of one operation flow may be replaced with some steps of another operation flow.

A program may be provided for causing a computer to execute each processing to be performed by the UE 100 or the base station 210. The program may be recorded on a computer readable medium. By using the computer readable medium, the program can be installed in the computer. Here, the computer readable medium on which the program is recorded may be a non-transitory recording medium. The non-transitory recording medium is not particularly limited to, but may be, for example, a recording medium such as a CD-ROM (Compact Disk Read Only Memory) or a DVD-ROM (Digital Versatile Disc Read Only Memory). Furthermore, a circuit that executes each processing to be performed by the UE 100 or the base station 210 may be integrated, and at least a part of the UE 100 or the base station 210 may be configured as a semiconductor integrated circuit (chipset, SoC (system-on-chip)).

Note that, in the above-described embodiment, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

The invention claimed is:

1. A communication apparatus configured to perform communication with a first network by using a first subscriber identity module and to perform communication with a second network by using a second subscriber identity module, the communication apparatus comprising:

a radio resource control (RRC) processor configured to perform processing for receiving a paging message from the second network; and a non-access stratum (NAS) processor configured to perform processing for transmitting a registration request message including capability information to an Access and Mobility Management Function (AMF) of the second network, the capability information indicating that the communication apparatus has capability for transmission of an indicator of not preferring a paging from the second network, wherein:

the RRC processor is configured to perform processing for providing the NAS processor with information based on the received paging message from the second network; and the NAS processor is configured to perform processing for:

receiving, from the AMF, a registration accept message including information indicating that the transmission of the indicator is accepted, in response to the transmission of the capability information; and transmitting, to the AMF, a service request message including the indicator in response to the received paging message, based on a determination that communication with the second network corresponding to the paging from the second network is not preferred, in a case where the information indicating that the transmission of the indicator is accepted is received.

2. The communication apparatus according to claim 1, wherein:

the RRC processor is configured to perform the processing for providing the NAS processor with the information based on the received paging message from the second network in a case where a notification related to the transmission of the indicator is provided by the NAS processor.

3. The communication apparatus according to claim 1, wherein:

the paging message includes a paging record including an identifier of the communication apparatus.

4. The communication apparatus according to claim 1, wherein:

the RRC processor is configured to perform the processing for providing the NAS processor with the information based on the received paging message from the second network in a case where the communication apparatus is in an RRC inactive state.

5. A communication method executed by a communication apparatus configured to perform communication with a first network by using a first subscriber identity module and to perform communication with a second network by using a second subscriber identity module, the communication method comprising:

performing processing, by a radio resource control (RRC) processor, for receiving a paging message from the second network;

performing processing, by a non-access stratum (NAS) processor, for transmitting a registration request message including capability information to an Access and Mobility Management Function (AMF) of the second network, the capability information indicating that the communication apparatus has capability for transmission of an indicator of not preferring a paging from the second network;

performing processing, by the RRC processor, for providing the NAS processor with information based on the received paging message from the second network;

performing processing, by the NAS processor, for receiving, from the AMF, a registration accept message including information indicating that the transmission of the indicator is accepted, in response to the transmission of the capability information; and performing processing, by the NAS processor, for transmitting, to the AMF, a service request message including the indicator in response to the received paging message, based on a determination that communication with the second network corresponding to the paging from the second network is not preferred, in a case where the information indicating that the transmission of the indicator is accepted is received.

6. The communication method according to claim 5, wherein:

the performing processing, by the RRC processor, for providing the NAS processor with the information based on the received paging message from the second network is performed in a case where a notification related to the transmission of the indicator is provided by the NAS processor.

7. The communication method according to claim 5, wherein:

the paging message includes a paging record including an identifier of the communication apparatus.

8. The communication method according to claim 5, wherein:

the performing processing, by the RRC processor, for providing the NAS processor with the information based on the received paging message from the second network is performed in a case where the communication apparatus is in an RRC inactive state.

* * * * *